(12) United States Patent
Comte

(10) Patent No.: US 7,456,121 B2
(45) Date of Patent: Nov. 25, 2008

(54) GLASS-CERAMIC MATERIALS, PRECURSOR GLASS THEREOF AND PROCESS-FOR MAKING THE SAME

(75) Inventor: Marie Jacqueline Monique Comte, Fontenay aux Roses (FR)

(73) Assignee: Eurokera, Chierry (FR)

( * ) Notice: Subject to any disclaimer, the term of this patent is extended or adjusted under 35 U.S.C. 154(b) by 153 days.

(21) Appl. No.: 11/473,482

(22) Filed: Jun. 23, 2006

(65) Prior Publication Data

US 2008/0026927 A1    Jan. 31, 2008

(51) Int. Cl.
*C03C 10/12*  (2006.01)
*C03C 3/083*  (2006.01)

(52) U.S. Cl. .................. 501/4; 501/7; 501/69; 501/70; 501/71; 65/33.8

(58) Field of Classification Search ................. 501/4, 501/7, 69–71; 65/33.8
See application file for complete search history.

(56) References Cited

U.S. PATENT DOCUMENTS 5,322,819 A * 6/1994 Araujo et al. ............... 501/13
5,729,381 A * 3/1998 Havens et al. ............... 359/361
6,930,289 B2   8/2005 Siebers et al. ............ 219/45.11

FOREIGN PATENT DOCUMENTS

| EP | A0437228 | 1/1991 |
|---|---|---|
| EP | A1398303 | 9/2003 |
| JP | 11100229 | 4/1999 |
| JP | 11100230 | 4/1999 |
| JP | 2003-048749 | 2/2003 |
| WO | WO 02/16279 | 2/2002 |

OTHER PUBLICATIONS

International Preliminary Report on Patentability, PCT/EP2006/063667 filed Jun. 29, 2006.

* cited by examiner

*Primary Examiner*—Karl E Group
(74) *Attorney, Agent, or Firm*—Sinen Chen; Steven J. Scott; Michael N. Russell

(57) ABSTRACT

The present invention relates to: novel glass-ceramics of β-quartz and/or of β-spodumene; articles made from said novel glass-ceramics; and ithium alumino-silicate glasses, which are precursors of said novel glass-ceramics; methods of preparing said novel glass-ceramics and articles made from said novel glass-ceramics. The present invention relates to the use of $SnO_2$ and of Br, as an agent for fining the glass-ceramic glass precursor.

16 Claims, No Drawings

GLASS-CERAMIC MATERIALS, PRECURSOR GLASS THEREOF AND PROCESS-FOR MAKING THE SAME

FIELD OF THE INVENTION

The present invention relates to: novel glass-ceramics, containing a solid solution of β-quartz or of β-spodumene (solid solutions of β-quartz and β-spodumène), as main crystalline phase(s); articles made from said novel glass-ceramics; lithium alumino-silicate glasses, which are precursors of said novel glass-ceramics; and methods of preparing said novel glass-ceramics and articles made from said novel glass-ceramics.

The present invention relates to the incorporation, within the compositions of said glass-ceramics and glasses, of original compounds so as to ensure the function of agent for fining the glass.

BACKGROUND OF THE INVENTION

The glass-ceramics which contain a solid solution of β-quartz or of β-spodumene (solid solutions of β-quartz and β-spodumène) as main crystalline phase(s) are materials which are known per se, and which are obtained by heat treatment of glasses or inorganic fillers. These materials are used in various contexts and notably as a substrate for cooktops and as fire-windows.

Transparent, opalescent, or even opaque glass-ceramics are known of various colors.

The preparation of articles made from glass-ceramic of β-quartz and/or β-spodumene classically comprise three main successive steps:
  a first step of melting an inorganic glass or a filler, which is a precursor of such a glass, which is generally carried out between 1,550 and 1,650° C.,
  a second step of cooling and shaping the molten glass obtained, and
  a third step of crystallization or ceramming of the cooled, shaped glass, by an appropriate heat treatment.

Upon completion of the first step of melting, it is important to remove gaseous inclusions as efficiently as possible from the molten glass mass. To this end, at least one fining agent is incorporated within it.

Arsenic oxide ($As_2O_3$) is generally used in the methods used hitherto, typically at more than 0.1% by weight and at less than 1% by weight. Antimony oxide ($Sb_2O_3$) is also used at higher contents.

In view of the toxicity of these products and of the most drastic rules in force (with reference to the safety and the protection of the environment), the incorporation of these products is sought to be minimized, even avoided, and other compounds are sought which are less toxic, even non-toxic and which are effective as fining agents.

Furthermore, for obvious reasons of economy, it is not desired to modify the operating conditions of the industrial method made use of at present. Notably, it is not desired to operate at higher temperature, which would imply spending more energy and would worsen the problems of corrosion.

Compounds other than arsenic oxide and antimony oxide are thus sought after which are effective under the same operating conditions as fining agents (compounds substituting, at least partially, advantageously totally, for said oxides) of the glass which is to be cerammed.

Notably, the use of tin oxide ($SnO_2$) has been proposed according to prior art within the context of such research.

Patent Applications JP 111 100 229 and 11 100 230 thus describe the use of tin oxide ($SnO_2$), alone or in combination with chlorine (Cl), at the rate of:

$SnO_2$: 0.1-2% by weight

Cl: 0-1% by weight.

Applications DE 19 939 787.2 and WO 02/16279 mention the use of tin oxide ($SnO_2$), cerium oxide ($CeO_2$), and sulfate or chlorine-containing compounds. These documents more particularly illustrate the use of tin oxide which is incorporated at less than 1% by weight. No specification on the fining performance obtained is found in said documents.

The inventor, faced with this technical problem of providing fining agents which substitute, at least partially, for $As_2O_3$ and/or $Sb_2O_3$, has studied the performances of $SnO_2$ and has shown that this compound is not fully satisfactory alone.

The effectiveness of $SnO_2$, as agent fining glasses precursors of glass-ceramics, increases with the amount of said $SnO_2$ incorporated. It is thus possible to obtain good results with regard to the fining of said glasses, which good results are almost comparable to those obtained hitherto notably with $As_2O_3$, by using adequate amounts of $SnO_2$. The incorporation of these adequate amounts, which are effective from a fining point of view, is detrimental:
  firstly, due to the low solubility of $SnO_2$ in the glass. Problems of devitrification and difficulties of implementation of the melting are observed very quickly, and
  secondly, due to the reducing power of $SnO_2$. $SnO_2$ can reduce transition metal oxides which are present in the glass, notably vanadium oxide, and can therefore strongly influence the color of the ceramic sought after. In its presence, in the amounts which are effective for the fining of the precursor glass, the color of the final glass-ceramic is difficult to control.

It is hardly sufficient to propose using $SnO_2$ as effective fining agent instead of the conventional fining agents ($As_2O_3$ and/or $Sb_2O_3$).

It is to the merit of the inventor to have demonstrated, in such a context, the interest of an "$SnO_2$+Br" combination, to have observed surprisingly that such an "$SnO_2$+Br" combination is effective as a fining agent, the $SnO_2$ being incorporated at a low content in said combination, such that the problems set forth above are minimized, even avoided.

SUMMARY OF THE INVENTION

Thus, according to a first object, the present invention relates to glass-ceramics containing a solid solution of β-quartz or of β-spodumene (solid solutions of β-quartz and β-spodumène), as main crystalline phase(s), which jointly contain tin oxide ($SnO_2$) and bromine (Br), said tin oxide being present in an amount which is less than or equal to 0.7% by weight of the total weight of the glass-ceramic.

According to a second object, the present invention relates to articles made from such a glass-ceramic, which glass-ceramic jointly contains $SnO_2$ in its composition in a non-excess amount, and Br.

According to a third object, the present invention relates to lithium alumino-silicate glasses, which are precursors of glass-ceramics of the invention.

According to a fourth object, the present invention relates to a method of preparing a glass-ceramic of the invention.

According to a fifth object, the present invention relates to a method of preparing an article made from a glass-ceramic of the invention.

DETAILED DESCRIPTION OF THE INVENTION

The glass-ceramics of the invention characteristically contain tin oxide in an amount which is non-excess with respect to the problems set forth above, and bromine. Said glass-ceramics contain, in an original and characteristic way, these two compounds, with respect to the technical problem set forth above, i.e. that of the fining of the glasses, which are the precursors of said glass-ceramics.

Within the glass-ceramics of the invention, the bromine is present in a low amount (generally 0.01 to 1% by weight of the total weight of the glass-ceramic), even if it is added in a greater amount during the preparation of the glass-ceramics. Its volatility explains its low content in the final glass-ceramics.

According to its first object, the present invention relates in other words to the joint use of tin oxide, in an amount which is less than or equal to 0.7% by weight, and bromine, within the glass-ceramic precursor glasses of β-quartz and/or of β-spodumene, this use being as an agent for fining said glasses.

The "$SnO_2$+Br" combination, the performances of which as fining agent were demonstrated within the context of the invention, can be incorporated in total or partial substitution for other fining agents, notably conventional fining agents $As_2O_3$ and/or $Sb_2O_3$.

It is therefore not excluded that the glass-ceramics of the invention contain other fining agents, in addition to said combination, other than $As_2O_3$ and/or $Sb_2O_3$ or $As_2O_3$ and/or $Sb_2O_3$, in an amount which is less than according to prior art. However, preferably, the glass-ceramics of the invention contain, with the exception of inevitable traces, neither arsenic, nor antimony. Particularly preferably, the glass-ceramics of the invention contain, with the exception of inevitable traces, neither arsenic (arsenic oxide), nor antimony (antimony oxide), nor other agents for fining the glass.

The glass-ceramics of the invention generally have a composition, expressed as percentages by weight of oxides and bromine, which contains: to 0.7%, advantageously 0.1 to 0.5%, of $SnO_2$; and to 1%, advantageously 0.01 to 0.1%, of Br.

The bromine content of the glass-ceramics of the invention (and of their precursor glasses) is low. The bromine added does in fact volatilize to a greater or lesser extent. Said content, which is low, remains in any case significantly greater than that of the glass-ceramics (and of their glass precursors) obtained without the addition of bromine.

Indication can be given below, in a totally non-limiting way, of what makes up part of the first object of the invention, of the glass-ceramics, the composition of which, expressed as percentages by weight of oxides and bromine, essentially consists of:

| | | |
|---|---|---|
| $SiO_2$ | 50-75, advantageously | 65-70 |
| $Al_2O_3$ | 17-27, advantageously | 18-22 |
| $Li_2O$ | 2-6, advantageously | 2.5-4 |
| MgO | 0-5, advantageously | 0.5-2 |
| ZnO | 0-5, advantageously | 1-3 |
| $TiO_2$ | 0-5, advantageously | 1.5-3.5 |
| $ZrO_2$ | 0-5, advantageously | 0-2.5 |
| BaO | 0-3, advantageously | 0-2 |
| SrO | 0-3, advantageously | 0-2 |
| CaO | 0-3, advantageously | 0-2 |
| $Na_2O$ | 0-3, advantageously | 0-1 |
| $K_2O$ | 0-3, advantageously | 0-1.5 |
| $P_2O_5$ | 0-8, advantageously | 0-3 |
| $B_2O_3$ | 0-3 | |
| $SnO_2$ | 0.1-0.7, advantageously | 0.1-0.5 |
| Br | 0.01-1, advantageously | 0.01-0.1. |

The advantageous ranges indicated above are to be considered independently from each other and in combination with each other. Thus, the glass-ceramics of the invention advantageously have the composition by weight indicated above in the right-hand column.

Indication is given that the compositions in question "essentially consist of" the list given of the oxides and of bromine. This signifies that within said compositions, the sum of the oxides and of the bromine which are listed represents at least 95%, generally at least 98% by weight. It is not in fact excluded to find, in low amounts, other compounds within said compositions such as lanthanum, yttrium, colorants (vide infra).

In the Application EP-A-0 437 228, The Applicant describes glass-ceramics, having interesting properties, which notably can be cerammed rapidly. Such glass-ceramics are advantageously concerned by the present invention. Thus, glass-ceramics also make up a part of the first object of the invention, the composition of which expressed as percentages by weight of oxides and bromine, essentially consists of:

| | |
|---|---|
| $SiO_2$ | 65-70 |
| $Al_2O_3$ | 18-19.8 |
| $Li_2O$ | 2.5-3.8 |
| MgO | 0.55-1.5 |
| ZnO | 1.2-2.8 |
| $TiO_2$ | 1.8-3.2 |
| BaO | 0-1.4 |
| SrO | 0-1.4 |
| with BaO + SrO | 0.4-1.4 |
| with MgO + BaO + SrO | 1.1-2.3 |
| $ZrO_2$ | 1.0-2.5 |
| $Na_2O$ | 0-<1.0 |
| $K_2O$ | 0-<1.0 |
| with $Na_2O + K_2O$ | 0-<1.0 |
| with $2.8Li_2O + 1.2ZnO/5.2MgO$ | >1.8 |
| $SnO_2$ | 0.1-0.7 |
| Br | 0.01-1. |

In the Application EP-A-1 398 303, the Applicant describes glass-ceramics of the same type, which are improved with reference to the problem of devitrification. Such glass-ceramics are also concerned by the present invention. Thus, glass-ceramics also make up a part of the first object of the present invention, the composition of which, expressed as percentages by weight of oxides and bromine, essentially consists of:

| | | |
|---|---|---|
| | $SiO_2$ | 65-70 |
| | $Al_2O_3$ | 18-20.5 |
| | $Li_2O$ | 2.5-3.8 |
| | MgO | 0.55-1.5 |
| | ZnO | 1.2-2.8 |
| | BaO | 0-1.4 |
| | SrO | 0-1.4 |
| with | BaO + SrO | 0.4-1.4 |
| with | MgO + BaO + SrO | 1.1-2.3 |
| | $Na_2O$ | 0-<1 |
| | $K_2O$ | 0-<1 |
| with | $Na_2O + K_2O$ | 0-<1 |
| with | $(2.8 Li_2O + 1.2 ZnO)/5.2 MgO$ | >1.8 |
| | $TiO_2$ | 1.8-3.5 |

-continued

| | ZrO$_2$ | 0.8-1.6 |
|---|---|---|
| with | $\frac{TiO_2}{ZrO_2} > 2.2$ | |
| | SnO$_2$ | 0.1-0.7 |
| | Br | 0.01-1. |

As set forth above, the glass-ceramics of the invention can contain colorants. Their composition can therefore contain an effective amount (with reference to the effect of coloration sought after) of at least one colorant. Said at least one colorant is advantageously selected from CoO, Cr$_2$O$_3$, Fe$_2$O$_3$, MnO$_2$, NiO, V$_2$O$_5$ and CeO$_2$ (thus taken alone or in combination). The person skilled in the art cannot ignore that V$_2$O$_5$ is commonly used for obtaining dark glass-ceramics.

According to its second object, the present invention relates to articles made from a glass-ceramic, as described above, which glass-ceramic jointly contains SnO$_2$ in its composition in a non-excess amount, and Br. Said articles can notably consist of cook-tops, cooking utensils, microwave oven plates, fireplace windows, fire-doors, fire-windows, pyrolysis- or catalysis-oven windows. Such a list is not exhaustive.

According to its third object, the present invention relates to lithium alumino-silicate glasses, which are precursors of glass-ceramics of the invention, as described above. The lithium alumino-silicate glasses, which jointly contain SnO$_2$, in the non-excess amount specified above, and Br, and which are precursors of the glass-ceramics of the invention, are in fact novel and therefore constitute the third object of the invention. Said novel glasses advantageously have a composition which corresponds to those specified above for the glass-ceramics of the invention.

Advantageously, said novel glasses have a composition which contains, with the exception of inevitable traces, neither arsenic, nor antimony. Very advantageously, said novel glasses contain, as fining agent, only the "SnO$_2$+Br" combination in the sense of the invention.

According to its fourth object, the present invention relates to a method of preparing a glass-ceramic of the invention, as described above. Classically, said method comprises heat treating a lithium alumino-silicate glass, which is a precursor of such a glass-ceramic, under conditions which ensure its ceramming. Such a ceramming treatment is known per se.

Characteristically, according to the invention, the method is implemented on a glass which jointly contains tin oxide (SnO$_2$), in an amount which is less than or equal to 0.7% by weight, and bromine (Br).

The glass-ceramic prepared advantageously contains said SnO$_2$ and Br in the amounts specified above with reference to the glass-ceramics of the invention, and advantageously has a composition which corresponds to one of the compositions specified above for the glass-ceramics of the invention.

According to its fifth object, the present invention relates to a method of preparing an article made from a glass-ceramic of the invention. Said method classically comprises the three following successive steps:

melting a lithium alumino-silicate glass or an inorganic filler, which is a precursor of such a glass, said glass or said filler containing an effective and non-excess amount of at least one fining agent; followed by fining the molten glass obtained;

cooling the molten fined glass obtained and, simultaneously, shaping it into the shape desired for the article sought after;

ceramming said shaped glass.

Characteristically, according to the invention, said glass or said filler in question has a composition which jointly contains tin oxide (SnO$_2$), in an amount which is less than or equal to 0.7% by weight, and bromine (Br).

The glass-ceramic constituting the article prepared advantageously contains said SnO$_2$ and Br in the amounts specified above with reference to the glass-ceramics of the invention, and advantageously has a composition which corresponds to one of the compositions specified above for the glass-ceramics of the invention.

Within the context of the above methods, it is specified in a totally non-limiting way that the bromine is in general added at the rate of 0.5 to 2%, advantageously 0.5 to 1.5%, of the weight of glass or of filler in question (a part of said bromine added is volatilized during the melting and the fining) and that said bromine can notably be provided in the form of potassium bromide (KBr) and/or magnesium bromide (MgBr$_2$).

The reader has understood that the present invention, in all its aspects, relates to the joint use, within the ceramizable compositions of lithium alumino-silicate glasses, of SnO$_2$, in controlled amounts, and bromine, as fining agent.

EXAMPLES

The invention is now illustrated by the following Examples.

More specifically, Examples 1, 2 and 3 illustrate said invention, whereas Examples A, B and C illustrate prior art.

Examples A, B, C; 1 and 2

Glasses

Table 1 below indicates: in its first part, the compositions by weight, of the glasses in question, which have been placed in the oven; and in its second part, the number of seeds per cm$^3$ of said glasses.

The glasses are prepared in the usual way from oxides and/or from compounds which can be decomposed easily, such as nitrates or carbonates. The starting materials are mixed to obtain a homogeneous mixture.

About 1,000 g of starting materials are placed in platinum crucibles. The crucibles are then introduced into an oven pre-heated to 1,400° C. They undergo therein the following melting cycle:

160 minutes of 1,400 to 1,600° C.,
100 minutes of 1,600 to 1,650° C.,
110 minutes at 1,650° C., and
60 minutes of 1,650 to 1,450° C.

They are then removed from the oven.

The glasses, in said crucibles, are then re-heated at 600° C.

The number of seeds having a diameter of more than 40 μm is then observed, on two samples (of 3 mm thickness), which are cut at 10 mm and 30 mm respectively below the surface of the glass. The value indicated in Table 1 below is an average of said number of seeds per cm$^3$.

Five batches were tested. They differ by the nature of the compound(s) which is (are) incorporated as fining agent: the one which corresponds to Example A contains arsenic oxide (As$_2$O$_3$); the one which corresponds to Example B contains tin oxide (SnO$_2$) and chlorine (Cl); the one which corresponds to Example C contains tin oxide (SnO$_2$) only; and the ones which correspond to Examples 1 and 2 of the invention contain tin oxide ($SnO_2$) and bromine (Br). Said bromine is introduced in the form of potassium bromide (KBr).

TABLE 1

| Composition placed in the oven (% by weight) | Examples | | | | |
|---|---|---|---|---|---|
| | A | B | C | 1 | 2 |
| $SiO_2$ | 68.30 | 68.43 | 68.83 | 67.23 | 67.13 |
| $Al_2O_3$ | 19.3 | 19.3 | 19.3 | 19.3 | 19.8 |
| $Li_2O$ | 3.5 | 3.5 | 3.5 | 3.5 | 4.1 |
| MgO | 1.1 | 1.1 | 1.1 | 1.1 | 1 |
| ZnO | 1.6 | 1.6 | 1.6 | 1.6 | 1.6 |
| $TiO_2$ | 2.6 | 2.6 | 2.6 | 2.6 | 2.6 |
| $ZrO_2$ | 1.8 | 1.8 | 1.8 | 1.8 | 1.7 |
| BaO | 0.8 | 0.8 | 0.8 | 0.8 | |
| $K_2O$ | 0.2 | 0.2 | 0.2 | 0.8 | 0.8 |
| $SnO_2$ | | 0.2 | 0.2 | 0.2 | 0.2 |
| Br | | | | 1 | 1 |
| Cl | | 0.4 | | | |
| $As_2O_3$ | 0.6 | | | | |
| $V_2O_5$ | 0.20 | 0.07 | 0.07 | 0.07 | 0.07 |
| Number of seeds/$cm^3$ | 20 | 300 | 640 | 80 | 80 |

The glasses according to the invention (Examples 1 and 2), as well as glass A of prior art, contain a number of seeds which is less than 100/$cm^3$. The glasses according to Examples B and C contain many more seeds. The results are better with the glass of Example B (which contains chlorine in addition to the tin oxide) than with the glass of Example C (which contains tin oxide only). However, the results with the chlorine ($SnO_2$+Cl: Example B) are much less interesting than those with bromine ($SnO_2$+Br: Examples 1 and 2 of the invention).

Example 3

Glass-Ceramic

This example shows that the presence of bromine within the glasses of the invention does not modify significantly the properties (thermal expansion and color) of the glass-ceramics (of the invention) which are obtained with such glasses. A glass of the invention was prepared. It was cerammed and the thermal expansion and the color of the ceramic obtained was measured.

Table 2 below indicates: in its first part, the composition by weight of the glass (and of the glass-ceramic); and in its second part, the properties of the glass-ceramic (coefficient of thermal expansion, integrated transmission Y and color points x, y derived from spectral analyses from transmission measurements with the aid of a spectrophotometer (illuminant D65/observer at 2°) on a sample of 3 mm thickness).

The glass was prepared in the usual way. About 2,000 g of starting materials were melted for 6 hours at 1,650° C. The molten glass was then poured onto a table and rolled to a thickness of 6 mm. Samples of this glass were cerammed according to the following program: 20 minutes from ambient temperature to 600° C.; 65 minutes from 600 to 930° C.; and 15 minutes at 930° C.

TABLE 2

| Example 3 | |
|---|---|
| Composition (% by weight) | |
| $SiO_2$ | 69.09 |
| $Al_2O_3$ | 19.4 |
| $Li_2O$ | 3.6 |
| MgO | 1.1 |

TABLE 2-continued

| Example 3 | |
|---|---|
| ZnO | 1.6 |
| $TiO_2$ | 2.7 |
| $ZrO_2$ | 1.7 |
| $K_2O$ | 0.5 |
| $SnO_2$ | 0.2 |
| Br | 0.04 |
| (for Br placed in the oven | 0.8) |
| $V_2O_5$ | 0.07 |
| Properties after ceramming | |
| Expansion (25-700° C.) | $2.8 \times 10^{-7} K^{-1}$ |
| Y | 3.95 |
| x | 0.596 |
| y | 0.3821 |

It is known that in order to be suitable as cook-tops, glass-ceramics (of this thickness) must have a coefficient of thermal expansion of less than $12 \times 10^{-7} K^{-1}$ (preferably less than $5 \times 10^{-7} K^{-1}$) and a Y of less than 4.5.

The results above are thus fully satisfactory.

What is claimed is:

1. A glass-ceramic, containing a solid solution of β-quartz or of β-spodumene as main crystalline phase(s), the glass-ceramic having a composition containing tin oxide ($SnO_2$) in an amount which is less than or equal to 0.7% by weight of the total weight of the glass-ceramic, and bromine (Br).

2. The glass-ceramic according to claim 1, the composition of which contains, with the exception of inevitable traces, neither arsenic, nor antimony.

3. The glass-ceramic according to claim 1, the composition of which, expressed as percentages by weight of oxides and bromine, contains:
0.1 to 0.7% of $SnO_2$ and
0.01 to 1% of Br.

4. The glass-ceramic according to claim 1, the composition of which, expressed as percentages by weight of oxides and bromine, essentially consists of:

| | |
|---|---|
| $SiO_2$ | 50-75 |
| $Al_2O_3$ | 17-27 |
| $Li_2O$ | 2-6 |
| MgO | 0-5 |
| ZnO | 0-5 |
| $TiO_2$ | 0-5 |
| $ZrO_2$ | 0-5 |
| BaO | 0-3 |
| SrO | 0-3 |
| CaO | 0-3 |
| $Na_2O$ | 0-3 |
| $K_2O$ | 0-3 |
| $P_2O_5$ | 0-8 |
| $B_2O_3$ | 0-3 |
| $SnO_2$ | 0.1-0.7 |
| Br | 0.01-1. |

5. The glass-ceramic according to claim 1, the composition of which, expressed as percentages by weight of oxides and bromine, essentially consists of:

| | |
|---|---|
| $SiO_2$ | 65-70 |
| $Al_2O_3$ | 18-22 |
| $Li_2O$ | 2.5-4 |
| MgO | 0.5-2 |
| ZnO | 1-3 |

-continued

|  |  |
|---|---|
| $TiO_2$ | 1.5-3.5 |
| $ZrO_2$ | 0-2.5 |
| BaO | 0-2 |
| SrO | 0-2 |
| CaO | 0-2 |
| $Na_2O$ | 0-1 |
| $K_2O$ | 0-1.5 |
| $P_2O_5$ | 0-3 |
| $SnO_2$ | 0.1-0.5 |
| Br | 0.01-0.1. |

6. The glass-ceramic according to claim 1, the composition of which, expressed as percentages by weight of oxides and bromine, essentially consists of:

|  |  |  |
|---|---|---|
|  | $SiO_2$ | 65-70 |
|  | $Al_2O_3$ | 18-19.8 |
|  | $Li_2O$ | 2.5-3.8 |
|  | MgO | 0.55-1.5 |
|  | ZnO | 1.2-2.8 |
|  | $TiO_2$ | 1.8-3.2 |
|  | BaO | 0-1.4 |
|  | SrO | 0-1.4 |
| with | BaO + SrO | 0.4-1.4 |
| with | MgO + BaO + SrO | 1.1-2.3 |
|  | $ZrO_2$ | 1.0-2.5 |
|  | $Na_2O$ | 0-<1.0 |
|  | $K_2O$ | 0-<1.0 |
| with | $Na_2O + K_2O$ | 0-<1.0 |
| with | $2.8Li_2O + 1.2ZnO/5.2MgO$ | >1.8 |
|  | $SnO_2$ | 0.1-0.7 |
|  | Br | 0.01-1. |

7. The glass-ceramic according to claim 1, the composition of which, expressed as percentages by weight of oxides and bromine, essentially consists of:

|  |  |  |
|---|---|---|
|  | $SiO_2$ | 65-70 |
|  | $Al_2O_3$ | 18-20.5 |
|  | $Li_2O$ | 2.5-3.8 |
|  | MgO | 0.55-1.5 |
|  | ZnO | 1.2-2.8 |
|  | BaO | 0-1.4 |
|  | SrO | 0-1.4 |
| with | BaO + SrO | 0.4-1.4 |
| with | MgO + BaO + SrO | 1.1-2.3 |
|  | $Na_2O$ | 0-<1 |
|  | $K_2O$ | 0-<1 |
| with | $Na_2O + K_2O$ | 0-<1 |
| with | $(2.8 Li_2O + 1.2 ZnO)/5.2 MgO$ | >1.8 |
|  | $TiO_2$ | 1.8-3.5 |
|  | $ZrO_2$ | 0.8-1.6 |

| | | |
|---|---|---|
| with | $\dfrac{TiO_2}{ZrO_2} > 2.2$ | |
|  | $SnO_2$ | 0.1-0.7 |
|  | Br | 0.01-1. |

8. The glass-ceramic according to claim 1, the composition of which further contains an effective amount of at least one colorant.

9. An article made from a glass-ceramic according to claim 1, which is a cook-top, a cooking utensil, a microwave oven plate, a fireplace window, a fire-door, a fire-window, a pyrolysis- or catalysis-oven window.

10. A method of preparing a glass-ceramic according to claim 1, which comprises heat-treating a lithium alumino-silicate glass, or an inorganic filler, which is a precursor of said glass-ceramic, under conditions which ensure its ceramming, wherein said glass jointly contains tin oxide ($SnO_2$), in an amount which is less than or equal to 0.7% by weight, and bromine (Br).

11. A method of preparing an glass-ceramic according to claim 10, which method successively comprises:
   melting a lithium alumino-silicate glass or an inorganic filler, which is a precursor of said; followed by fining the molten glass obtained;
   cooling the molten fined glass obtained and, simultaneously, shaping it into the shape desired for the article sought after;
   ceramming said shaped glass,
   wherein said glass or said filler has a composition which jointly contains tin oxide ($SnO_2$), in an amount which is less than or equal to 0.7% by weight, and bromine (Br).

12. The method according to claim 10, wherein said glass or said filler contains bromine (Br), which is added at 0.5 to 2% of the total weight of said glass or of said filler.

13. The method according to claim 10, wherein said glass or said filler contains bromine (Br), which is added as potassium bromide (KBr) and/or as magnesium bromide ($MgBr_2$).

14. The glass-ceramic according to claim 1, the composition of which, expressed as percentages by weight of oxides and bromine, contains:
   0.1 to 0.5%, of $SnO_2$ and
   0.01 to 0.1%, of Br.

15. The glass-ceramic according to claim 1, the composition of which further contains an effective amount of at least one colorant selected from CoO, $Cr_2O_3$, $Fe_2O_3$, $MnO_2$, NiO, $V_2O_5$ and $CeO_2$.

16. A lithium alumino-silicate glass, having a composition that corresponds to the glass-ceramic of claim 4.

* * * * *